United States Patent [19]

Jacobson

[11] Patent Number: 4,858,854

[45] Date of Patent: Aug. 22, 1989

[54] INFLATABLE AERODYNAMIC WING STRUCTURE

[76] Inventor: Barry J. Jacobson, 30 Queen Street, Shepshed, Loughborough, Leicestershire, LE12 9RZ, England

[21] Appl. No.: 169,032

[22] Filed: Mar. 16, 1988

[30] Foreign Application Priority Data

Mar. 16, 1987 [GB] United Kingdom ............... 8706134

[51] Int. Cl.⁴ ............................................... B64C 3/30
[52] U.S. Cl. .................................... 244/123; 244/219; 114/39.2
[58] Field of Search ................. 244/123, 219; 416/84; 114/39.2

[56] References Cited

U.S. PATENT DOCUMENTS

| | | | |
|---|---|---|---|
| 3,957,232 | 5/1976 | Sebrell | 244/123 |
| 4,102,519 | 7/1978 | Crosby | 244/123 |
| 4,261,534 | 4/1981 | Roselli | 244/219 |
| 4,533,099 | 8/1985 | Stewart | 244/219 |
| 4,582,278 | 4/1986 | Ferguson | 244/219 |
| 4,725,021 | 2/1988 | Priddy | 244/123 |

FOREIGN PATENT DOCUMENTS 2165513  4/1986  United Kingdom ............... 244/123

Primary Examiner—Sherman D. Basinger
Assistant Examiner—Stephen P. Avila
Attorney, Agent, or Firm—Roylance, Abrams, Berdo & Goodman

[57]  ABSTRACT

An inflatable aerodynamic wing structure comprising an aerodynamic skin, a first inflatable member positioned inside the skin such that it extends longitudinally of the wing structure adjacent a leading edge portion of the wing structure, a second inflatable member positioned inside the skin such that it extends longitudinally of the wing structure adjacent a trailing edge portion of the wing structure, and an inflatable chamber positioned between the first and the second inflatable members, the wing structure being such that the first and the second inflatable members are adapted to be inflated to a higher pressure than the inflatable chamber so that, in use of the wing structure, the first and the second inflatable members provide longitudinal rigidity and the inflatable chamber forms the skin into the aerodynamic shape required by the wing structure, and the inflatable chamber being such that it is inflatable at least primarily by dynamic pressure.

5 Claims, 4 Drawing Sheets

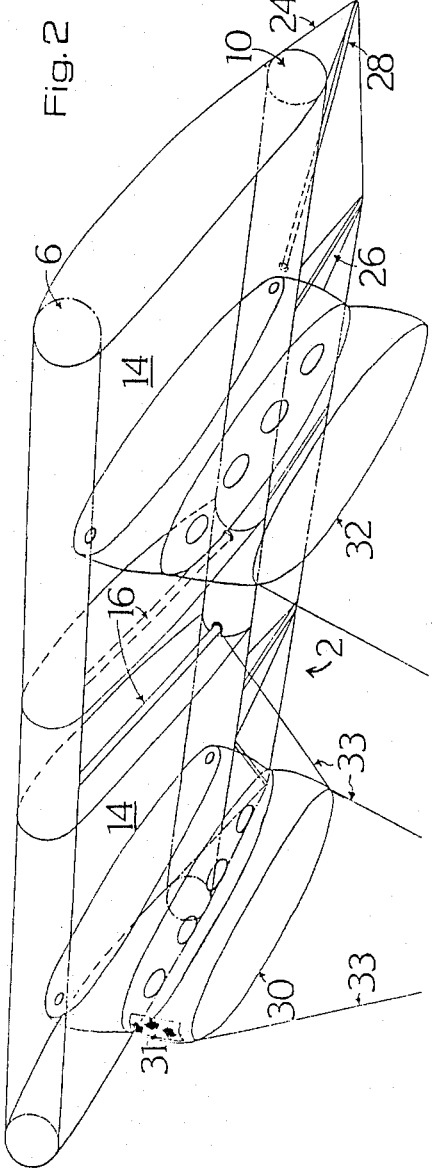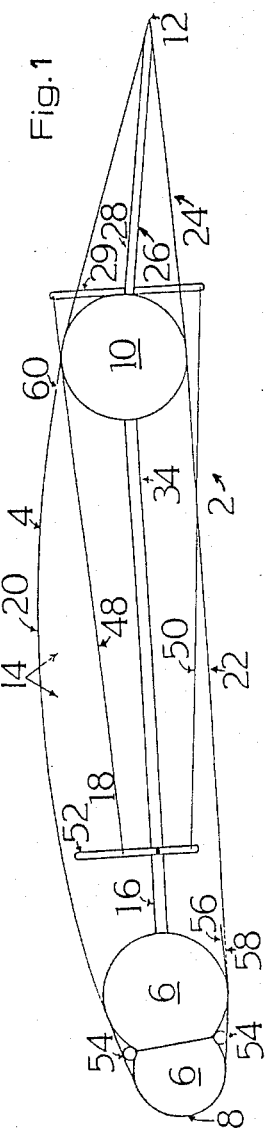

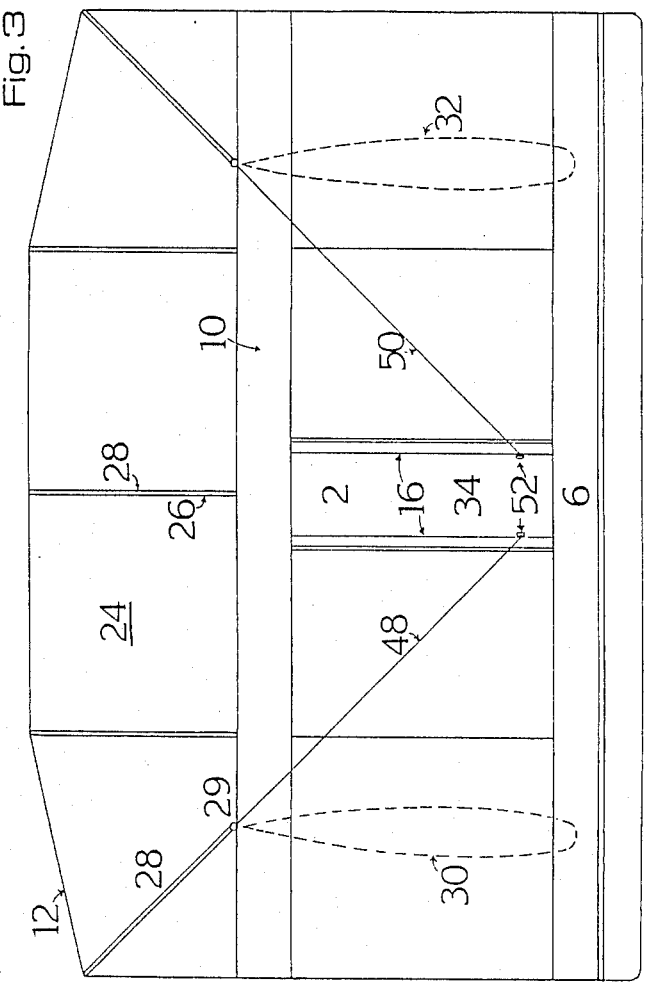

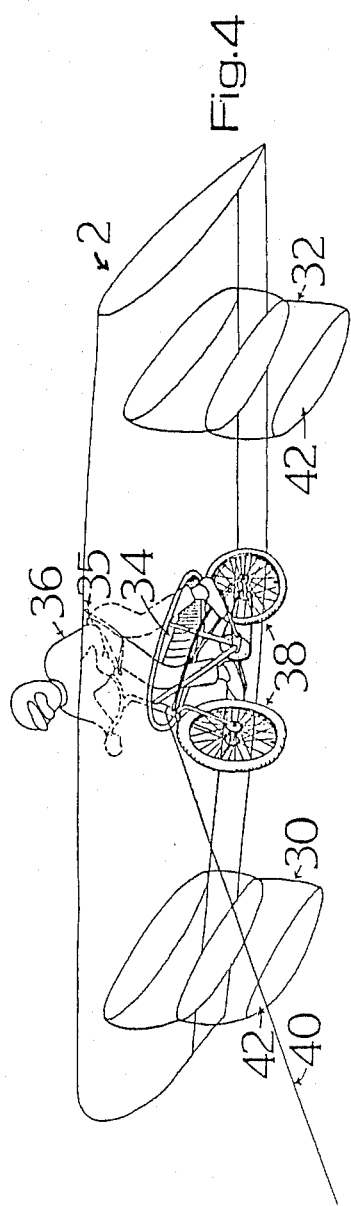
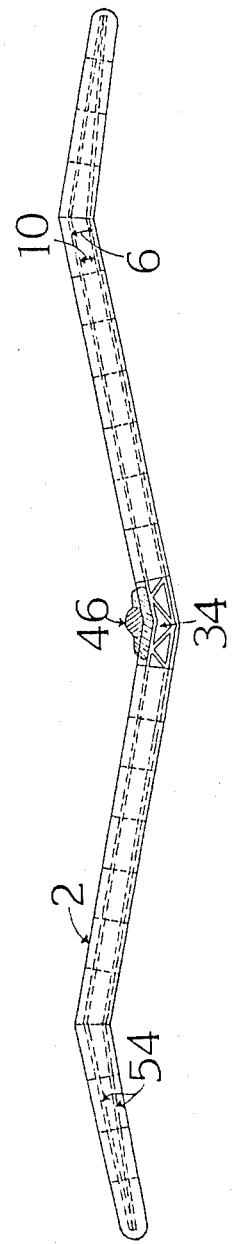
Fig.4
Fig.5

INFLATABLE AERODYNAMIC WING STRUCTURE

This invention relates to an inflatable aerodynamic wing structure.

Inflatable aerodynamic wing structures are known. These inflatable aerodynamic wing structures are advantageous over non-inflatable wing structures made from metals or other rigid materials. More specifically, the inflatable aerodynamic wing structures have the advantage that they can easily be stored and transported, that their structureal weight is less than the non-inflatable aerodynamic wing structures, and their crash impact damage can be minimised.

One known inflatable aerodynamic wing structure is disclosed in U.S. Pat. No. 3,957,232. The wing structure illustrated in this USA patent specification is typical to the extent that a number of inflatable tubes extend longitudinally of the wing structure and these inflatable tubes need to be covered by an outer skin in order to form the required aerodynamic shape. In my United Kingdom patent specification No. 2165513A I have shown an inflatable aerodynamic wing structure which avoids the problems associated with the inflatable aerodynamic wing structure shown in the U.S. Pat. No. 3,957,232 and, more particularly, avoids the need for inner and outer skins.

The present invention also avoids the need for inner and outer skins as required by the USA patent specification, and the present invention also provides an alternative wing structure to that shown in my United Kingdom patent specification No. 2165513A.

Accordingly, this invention provides an inflatable aerodynamic wing structure comprising an aerodynamic skin, a first inflatable member positioned inside the skin such that it extends longitudinally of the wing structure adjacent a leading edge portion of the wing structure, a second inflatable member positioned inside the skin such that it extends longitudinally of the wing structure adjacent a trailing edge portion of the wing structure, and an inflatable chamber positioed between the first and the second inflatable members, the wing structure being such that the first and the second inflatable members are adapted to be inflated to a higher pressure than the inflatable chamber so that, in use of the wing structure, the first and the second inflatable members provide longitudinal rigidity and the inflatable chamber forms the skin into the aerodynamic shape required by the wing structure, and the inflatable chamber being such that it is inflatable at least primarily by dynamic pressure.

The inflatable chamber forms the skin into a required chamber, and the wing structure may form higher lift aerofoil sections by the addition of longitudinal members at the leading edge of the wing structure. The longitudinal members may have a smaller cross section than the adjacent first inflatable member, but they may be internally inflated with the first inflatable member. Such an arrangement may provide a sharp nose section and may facilitate the provision of a point along the span of the wing structure at which air could usefully be introduced to the upper wing surface in order to re-energise the boundary layer and prevent a laminar separation bubble, which is a characteristic of low speed, high lift aerofoils. This arrangement may give improved penetration for low thrust applications.

The higher pressure int he first and second inflatable members gives the wing structure its required rigidity. The pressure in the second inflatable member may be less than that in the first inflatable member in order to vary the rigidity of the wing structure. The pressure in the first and the second inflatable members may be, for example, two to three pounds per square inch. The lower pressure in the inflatable chamber may be, for example, 0.1-0.4 lbs per square inch. The use of the first and the second inflatable members with the inflatable chamber ensures that the aerodynamic structure can be formed without needing inner and outer skins.

The aerodynamic structure may be made of a fabric material or a plastics material. The fabric material may be coated with a rubber material. Examples of suitable materials are polyvinylchloride coated nylon, polyurethane coated nylon or unsupported polyurethane film.

Usually, the first and the second inflatable members will be tubes.

The first inflatable member may have a figure of eight cross sectional shape. The first inflatable member may be a simple tube of round cross section if desired. If a figure of eight cross sectional shape is required, two separate inflatable members, one larger than the other, can be employed so that they will together constitute a first inflatable member separated by a rigid or non-rigid web.

The second inflatable member is preferably cylindrical in shape.

The first and the second inflatable members may be made of plastics coated fabric or nil - porosity nylon.

The inflatable aerodynamic wing structure may include spacer members which extend transversely of the wing structure between the first and the second inflatable members.

The spacer members may be rigid spacer members or they may be flexible spacer members. A mixture of rigid and flexible spacer members may also be employed.

The inflatable aerodynamic wing structure may also include shape-constraining members extending transversely of the wing structure and positioned between top and bottom walls of the wing structure.

The inflatable aerodynamic wing structure may include a pair of depending strengthening members serving as under-wing fins for stablising the wing structure relative to moving air.

The pair of depending strengthening members will usually be inflatable.

The inflatable aerodynamic wing structure may include a non-inflatable trailing edge section positioned aft of the second inflatable member.

The non-inflatable trailing edge section may be connected to the second inflatable member.

The inflatable chamber may advantageously be provided with ambient air inlet means for enabling the inflatable chamber to self-inflate during use of the wing structure.

The ambient air inlet means may be an air inlet port extending in close proximity and parallel with a sealed inflated fabric leading edge body and formed as a continuation of the under surface of the aerodynamic skin by an air-permeable mesh covered internally by an extension of the non-permeable outer skin to form a simple flap functioning as a non-return air gate.

The inflatable aerodynamic wing structure may also include a rigid member, for exmaple positioned along the first inflatable member, for giving heavier mid-span loading. The rigid member may be tubes which are joined in modular lengths by purpose-made sockets and which could be accommodated along troughs formed between the first inflatable member and the aerodynamic skin.

The inflatable aerodynamic wing structure may also include control means for giving good pilot control extending beyond the limits of body weight-shift methods. The control means may comprise a steering bar operating a trailing edge strut at the tips of the wing structure to combine the conventional functions of elevons and flaps. Alternatively, semi-span wing-warping may be used for these functions.

The inflatable aerodynamic wing structure may also include means for giving self-centering stability. The means for giving self-centering stability may be under-wing fins which are toed-in to provide yawing stability and canted inwardly to provide rolling stability in conjunction with wing dihedral angle which would be a function of mid-point loading and inflation pressure. Additionally, the trailing edge may be given an angle of reflex to provide pitching stability. A central aperture may be provided which is situated between the inflatable members and which allows air to flow vertically through the wing structure and which further aids the pitching characteristics.

The inflatable aerodynamic wing structure may also include other features such for example as segmented inflatable members with separate valves or inter-connectd bodies for the purpose of reducing the number of separately inflated chambers.

Embodiments of the invention will now be described solely by way of example and with reference to the accompanying drawings in which:

FIG. 1 is a section through a first wing structure;

FIG. 2 is an underneath perspective view of a second wing structure;

FIG. 3 is a top plan view of the wing structure as shown in FIG. 2;

FIG. 4 shows a modified form of the wing structure shown in FIGS. 2 and 3 and in use of a first mode of use;

FIG. 5 is an end view of a structure of the general type shown in FIGS. 2 and 3 in a second mode of use.

Figure 6:
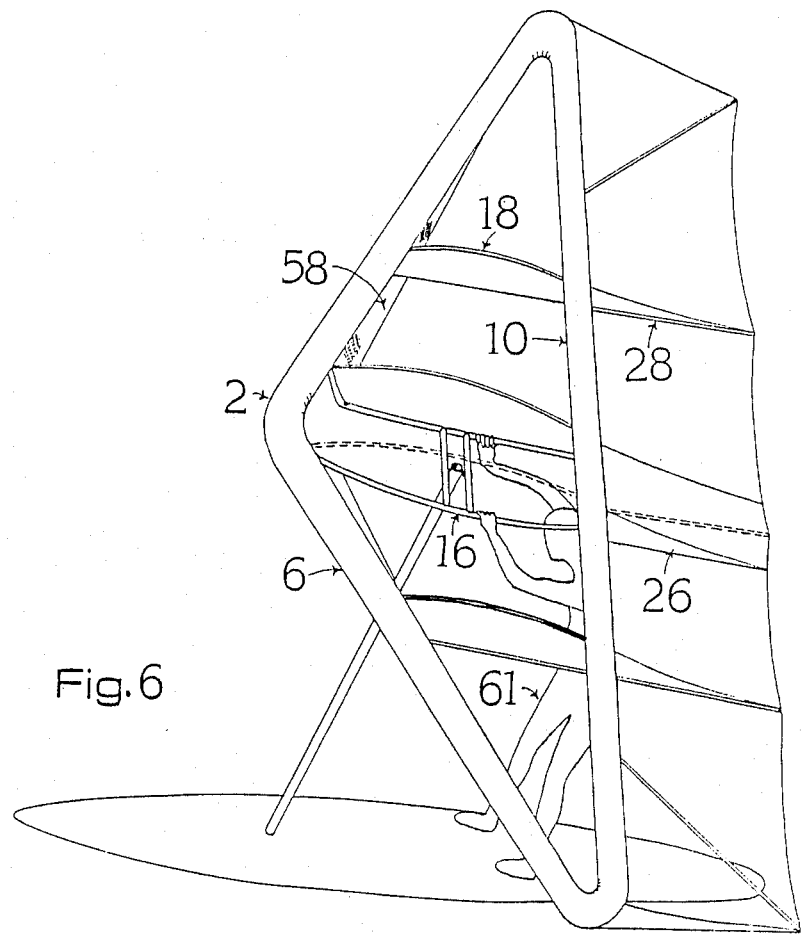
FIG. 6 is a side perspective view showing a modified form of the wing structure of the general type shown in FIGS. 2 and 3 in a third mode of use.

Referring to FIG. 1, there is shown an inflatable aerodynamic wing structure 2 comprising an aerodynamic skin 4. A first inflatable member 6 is positioned inside the skin 4 such that it extends longitudinally of the wing structure 2 adjacent a leading edge portion 8 of the wing structure 2. A second inflatable member 10 is positioned inside the skin 4 such that it extends longitudinally of the wing structure 2 adjacent a trailing edge portion 12 of the wing structure 2.

An inflatable chamber 14 is positioned between the first and the second inflatable members 6,10.

The wing structure 2 is such that the first and the second inflatable members 6,10 are adapted to being inflated to a higher pressure than the inflatable chamber 14 so that, in use of the wing structure 2, the first and the second inflatable chamber 6,10 provide longitudinal rigidity and the inflatable chamber 14 forms the skin 4 into the aerodynamic shape required by the wing structure 2.

The aerodynamic skin 4 may be made of a fabric material or a plastics material. The fabric material may be coated with a rubber coating.

AS can be seen from FIG. 1, the first inflatable member 6 has a figure of eight cross section. The second inflatable member 10 has a circular cross section. The first and the second inflatable members 6,10 may be made of rubber or a plastics material.

The wing structure 2 includes spacer members 16 which are in the form of rods and which extend transversely of the wing structure 2 between the first and the second inflatable members 6,10. Depending upon the type of wing structure 2 required, the spacer members 16 may be rigid, flexible or a mixture of rigid and flexible spacer members.

The wing structure 2 further includes shape-constraining members 18 which are in the form of webs and batons and which extend transversely of the wing structure, and which can extend between top and bottom walls 20,22 of the wing structure 2.

As shown in FIG. 1, the trailing edge portion 12 includes a non-inflatable trailing edge section 24. This non-inflatable trailing edge section 24 has a web 26 and a rod member 28. The non-inflatable trailing edge section 24 connects to the second inflatable member 10.

A rigid member 54 is provided at the position shown along the upper surface of, or along both upper and lower surfaces of, the first inflatable member 6, in which relationships they may be separated by a rigid or non-rigid web. The rigid member 54 enables heavier mid-span loading of the wing structure 2. Also shown in FIG. 1 is an ambient air inlet means in the form of an air inlet flap 56, and an outlet means in the form of a spanwise slot 60. During use of the wing structure 2, oncoming air will cause the flap 56 to rise and so air can enter the inflatable chamber 14 through an air inlet 58. When the air pressure in the inflatable chamber 14 is sufficiently high, it will force the air flap 56 downwardly as shown in FIG. 1 to close the air inlet 58. By using such an air flap 56, the inflatable chamber 14 can be self-inflating during operation.

The air in the inflatable chamber 14 can be allowed to bleed from the upper surface 20 at slot 60 which is positioned in close proximity to the point of boundary layer transition. At this point, the uninterrupted flow might change from laminar to a laminar separation bubble for a low speed aerofoil section. By allowing the air to bleed into the laminar air flow, it can transist to turbulent flow without incurring the larger drag penalty of the separation bubble.

Referring now to FIG. 2, similar parts as in FIG. 1 have been given the same reference numerals and their precise construction and operation will not again be given. In FIG. 2, it will be seen that the first inflatable member 6 is of circular cross section, similar to the cross sectional shape of the second inflatable member 10.

In FIG. 2, the wing structure 2 is provided with a pair of depending strengthening members 30,32 which are inflatable and which hang from the wing structure 2 as shown. These strengthening members 30,32 can be both statically and dynamically inflated in conjunction with the rest of the wing structure 2. Their leading edges may incorporate mesh air vents 31 which would introduce the oncoming air into the wing chamber 14 and thus eliminate the need for the flap 56 and the inlet 58 in a paraglide or a paraplane mode of use in which form the pilot may be suspended below the wing on a tubular structure or from rigging lines 33 attached to the members 16,30,32 in a conventional hanging arrangement. In this latter mode of use, an arc-anhedral configuration would normally be adopted as is current practice with dynamically inflated ram-air parachutes. The wing structure 2 may also be used for tethered safe flying over water, for example towed behind a boat which is relatively low powered as compared to boats used in parascending.

The position of the depending strengthening members 30,32 is also shown in FIG. 3. FIG. 3 also illustrates most clearly the shape of the non-inflatable trailing edge section 24, the webs 26 and the rod members 28.

The corner forming struts 28 can have additioal members 29 positioned in perpendicular relationship and in close proximity to the second inflatable member 10. These would have the function of bellcranks as means for relative deflection of the trailing edge corners to provide flying control via control lines 48,50 over the wing structure 2, see FIG. 3.

Referring to FIG. 4, the wing structure shown in FIGS. 2 and 3 has been modified to provide a central aperture 34. A youth 36 is positioned on a bicycle 38 in the aperture 34. Attached to the bicycle 38 is a tow line 40. If the two line 40 is towed by a person (not shown), the bicycle 38 can, in appropriate wind speeds, gain sufficient speed to cause the wing structure 2 to fly. The depending strengthening members 30,32 assist in protecting the youth in the event of a sudden landing and the bottoms 42,44 of the depending strengthening members 30,32 respectively may be strengthened by the addition of skidding pads or skate boards as appropriate. The youth can equally save airframe weight, dispense with the bicycle (which may have been motorised with an add-on engine) and lie prone in the aperture 34. The rider can then take personal control for untethered flights for which a pair of control lines 48,50 (see FIG. 1) are provided on each side for operation by the pilot's hands/wrists moving control levers 52 which can thereby deflect the trailing edge as previously described. Alternatively, the pilot may be provided with a pair of control lines which are attached to levers (as used by wing parachute flyers) to warp or twist one or both of the tips of the wing structure 2 by the relative movement of the inflated members 6,10 to give rolling control over the wing structure 2. The pilot may be attached to the tubes 16 by a hip harness 35 which would allow for both prone and upright body positions.

Referring to FIG. 5, it will be seen that the youth 36 of FIG. 4 has been replaced by a prone pilot accommodated within the central aperture 34. The pilot 46 is minimising his body drag by adopting this prone position out of the free air stream. In this embodiment, designed for efficient soaring, the rigid member 54 is provided with a central locking joint having a built-in dihedral and sweepback and two additional spanwise joints, the outermost of which have built-in anhedral and sweepforward. This arrangement of wing form, combined with the variable rigidity of the non-inflatable trailing edge section 24 because of its connection to the second inflatable member 10, may usefully minimise induced drag in higher speed gliding flight. This embodiment of the wing structure 2 may be provided with tapering wings and a fly-by-wire control system.

Referring now to FIG. 6, there is shown a more direct body weight-shift control system which could make windsoaring into an advanced form of windsurfing when combined with the simple wing structure 2 in basic form. It will be seen that the inflatable members 6 and 10 have been combined into a common inflation chamber and the aerofoil has been mounted on to a windsurfing mast. With inflatable windsurfing sail, wing and board weighing less than 20 lbs, it is possible to wave-soar with a high-lift wing of the general type shown attached to a windsurfing rig. The buoyant projecting wing structure 2 could prevent the full destabilisation situation in current windsurfing practice requiring the surfer 61 to remount the board from the water.

It is envisaged that the wing structure 2 of the present invention can be used whenever a simple collapsible aerofoil with a minimal drag penalty is required for low speed vehicles of lightweight construction to which under wing-tip keels may usefully reduce total vehicle drag. High lift to drag ratios can be maintained up to speeds approaching 100 mph by closer spacing of the flexible shape-constraining webs and rigid shape-forming members which could be tapered sail battens (as they bend asymetrically under inflation tension). The simplest form of man carrying wing could provide an exciting leisure activity for young persons with limited resources and may even be used in conjunction with action-type bicycles as a tethered parakite. The wing structures 2 could also be used in a paragliding mode by parachute soaring and hang-glider pilots for back-pack gliding and soaring. They may be externally braced with rigging lines to restrain wing billows in order that the flight vehicle may safely descend when the sealed inflated fabric structural bodies are not fully pressurised. Furthermore, powered flight versions may use the exhaust gases from their engines to supplement the static pressure element of the wing structure 2. Additionally, a small horse power motor may be used to power both a ducted propeller and the wheels of a road and sea worthy vehicle into which the stowable wing could be packed for transportation on land and water. It is to be appreciated that these storage and transportation advantages, when added to the ability of the inflated structure to deform without causing damage when impacted, can combine to create a multiple purpose vehicle and provide simpler and safer flying from both land and water for more people than presently fly for recreational purposes.

The embodiments of the invention described above with reference to the accompanying drawings have been given by way of example only and modifications may be effected. Thus, for example, the wing structures 2 may be provided with an enclosed cabin of shock-absorbing composite construction with one or more seats. Also, the wing structures 2 may be externally braced between, for example, members 16,32 and 54 in order to allow the deflated wing to billow safely or to increase the design safety factor for higher load and/or speed applcations.

I claim:

1. An inflatable aerodynamic wing structure comprising an aerodynamic skin, a first inflatable member positioned inside the skin such that it extends longitudinally of the wing structure adjacent a leading edge portion of the wing structure, a second inflatable member positioned inside the skin such that it extends longitudinally of the wing structure adjacent a trailing edge portion of the wing structure, and an inflatable chamber which is positioned between the first and the second inflatable members and which is larger than the first and the second inflatable members, the wing structure being such that the first and the second inflatable members are adapted to be inflated to a higher pressure than the inflatable chamber so that, in use of the wing structure, the first and the second inflatable members provide longitudinal rigidity and the inflatable chamber forms the skin into an aerodynamic shape required by the wing structure, and the inflatable chamber being such that it is inflatable at least primarily by dynamic pressure via an air flap which is provided in a forward and underneath part of the inflatable chamber and which is such that it is opened by oncoming ambient air during use of the wing structure and is closed by air pressure in the inflatable chamber when sufficient air has been admitted to the inflatable chamber.

2. An inflatable aerodynamic wing structure according to claim 1 and including a pair of inflatable members which are positioned one towards each end of the wing structure for the purpose of strengthening the wing structure, and the pair of inflatable members being such that when they are inflated they depend from the underneath part of the inflatable chamber for the purpose of giving protection to a person using the wing structure and being positioned in a middle part of the wing structure.

3. An inflatable aerodynamic wing structure according to claim 1 in which the first inflatable member has a figure of eight cross sectional shape, in which the second inflatable member is cylindrical, and in which the inflatable aerodynamic wing structure includes a rigid non-inflatable elongate member which extends along an upper surface of the first inflatable member for substantially the entire length of the wing structure.

4. An inflatable aerodynamic wing structure according to claim 1 in which the first inflatable member has a figure of eight cross sectional shape, in which the second inflatable member is cylindrical and in which the aerodynamic wing structure includes;
  (a) a pair of rigid non-inflatable elongate members which extend one along an upper surface of the first inflatable member for substantially the entire length of the wing structure, and one along a lower surface of the first inflatable member for substantially the entire length of the wing structure;
  (b) spacer members which extend transversely of the wing structure between the first and the second inflatable members;
  (c) shape-constraining members extending transversely of the wing structure and positioned between top and bottom walls of the wing structure; and
  (d) a non-inflatable trailing edge section which is positioned aft of the second inflatable member and which is connected to the second inflatable member.

5. An inflatable aerodynamic wing structure according to claim 1 and including
  (a) control means for giving pilot control extending beyond the limits of body weight-shift methods; and
  (b) means for giving a self-centering stability; the control means comprising a steering bar operating a trailing edge strut at the tips of the wing structure to combine the conventional functions of elevons and flaps.

* * * * *